United States Patent [19]

Bertorello

[11] Patent Number: 4,678,077
[45] Date of Patent: Jul. 7, 1987

[54] SYSTEM FOR CONTROLLING THE JAWS OF A SELF-CENTERING PLATFORM (PALLET) WHICH CAN BE MOVED BETWEEN FITTINGS (PALLET SUPPORTS) CARRIED BY THE LOADING AND UNLOADING STATION AND THE WORKING STATION OF A MACHINE TOOL

[75] Inventor: Mario Bertorello, Turin, Italy

[73] Assignee: Rotomors S.p.A, Turin, Italy

[21] Appl. No.: 702,468

[22] Filed: Feb. 19, 1985

[30] Foreign Application Priority Data

Dec. 7, 1984 [IT] Italy .................................. 54134 8/84

[51] Int. Cl.$^4$ ............................................. B23Q 3/00
[52] U.S. Cl. ................................. 198/803.01; 198/345;
198/803.7; 269/20; 269/25; 269/30; 269/34
[58] Field of Search ................ 198/345, 803.01, 803.7,
198/346.1, 346.2, 346.3, 339.1, 803.3; 269/20,
25, 30, 34; 29/33 P, 563, 568

[56] References Cited

U.S. PATENT DOCUMENTS

| 3,658,315 | 4/1972 | Boncherie | 198/803.01 |
| 4,326,831 | 4/1982 | Bergman | 269/34 |
| 4,520,919 | 6/1985 | Keitaro | 198/803.01 |
| 4,557,371 | 12/1985 | Yonezawa | 198/803.3 |

FOREIGN PATENT DOCUMENTS

| 3232367 | 3/1984 | Fed. Rep. of Germany | 269/20 |
| 3309555 | 9/1984 | Fed. Rep. of Germany | 269/20 |

OTHER PUBLICATIONS

"Autocentranti," *Dizionario D'Ingegneria*, edited by Federico Filippi, vol. 1, p. 787.
Vertical Turning Machine AC.15 CNC with Pallet System.
Kepner, two-page brochure Relating to Kepsel Cartridge Type Valve Insert.

Primary Examiner—Robert J. Spar
Assistant Examiner—Lyle Kimms
Attorney, Agent, or Firm—Lahive & Cockfield

[57] ABSTRACT

A system for controlling the jaws of a self-centering pallet which can be moved between pallet supports at the loading and unloading station and the working station of a machine tool includes an external hydraulic control circuit with a pair of ducts each of which communicates, through a respective connector device, with a pair of supply and discharge ducts of a double-acting cylinder incorporated in the pallet to control the jaws. Each connecting device includes interengageable connectors projecting from the mutually-facing surfaces of the pallet and the pallet support, a non-return valve located upstream of the connector on the pallet, and a rod passing through the connector on the pallet support and able to advance and open the non-return valve under the action of a piston subject to a pilot pressure. The connector on the pallet support is movable axially and connected to a valve which is held open against the action of resilient member when the connector on the pallet support engages the connector on the pallet during the superpositioning of the pallet on the pallet support.

6 Claims, 5 Drawing Figures

SYSTEM FOR CONTROLLING THE JAWS OF A SELF-CENTERING PLATFORM (PALLET) WHICH CAN BE MOVED BETWEEN FITTINGS (PALLET SUPPORTS) CARRIED BY THE LOADING AND UNLOADING STATION AND THE WORKING STATION OF A MACHINE TOOL

BACKGROUND OF THE INVENTION

The present invention relates to a system for controlling the jaws of a self-centering platform (pallet) which can be moved between base fittings (pallet supports) carried by the loading and unloading station and the working station of a machine tool.

Machine tools are already known which have self-centering pallets in which the automatic control of the jaws is achieved by incorporating a double-acting hydraulic cylinder in the pallets to act on the drive mechanisms which control the movements of the respective jaws. The opposing chambers of the hydraulic cylinder communicate through a pair of supply and discharge ducts with the same number of ducts of a control circuit formed, outside the pallet, in the spindle which supports the latter.

However, in the case of self-centering pallets which can be moved between pallet supports carried by the loading and unloading station and the working station of a machine tool, such as a vertical turning machine, the control for the jaws is manual because of the difficulty of keeping these jaws in the clamping position when the pallet is removed from its support provided with ducts belonging to a hydraulic control circuit outside the pallet.

OBJECTS AND SUMMARY OF THE INVENTION

The object of the present invention is to overcome these limitations and allow the use of a self-centering pallet with automatic, hydraulic jaw-control even when the pallet itself must be moved between pallet supports carried by the loading and unloading station and the working station of a machine tool, particularly a vertical turning machine.

According to the present invention this object is achieved by a system for controlling the jaws of a self-centering pallet which can be moved between pallet supports carried by the loading and unloading station and the working station of a machine tool, characterised in that it includes, in known manner, a double-acting hydraulic cylinder incorporated in the pallet to control the movements of the jaws and communicating through a pair of supply and discharge ducts with the same number of ducts of a hydraulic control circuit outside the pallet, and also in that:

the ducts of the external hydraulic control circuit are formed in the pallet support of one of the stations, and each of them communicates with one of the supply and discharge ducts through a connecting device including:

interengageable connectors mounted in correspondence with the mutually-facing surfaces of the pallet and the pallet support;

a non-return valve located upstream of the connector projecting from the pallet;

a rod passing through the connector projecting from the pallet support and able to advance and open the non-return valve under the action of a piston subject to a pilot pressure;

the connector projecting from the pallet-support being movable axially and connected to a valve which is held open against the action of resilient means when the connector is engaged in that connector projecting from the pallet during the superpositioning of the latter on the pallet support.

BRIEF DESCRIPTION OF THE DRAWINGS

Other characteristics and advantages of the invention will become apparent from the following description which refers, by way of example, to a preferred embodiment illustrated in the appended drawings, in which.

DESCRIPTION OF PREFERRED EMBODIMENT

Figure 1:
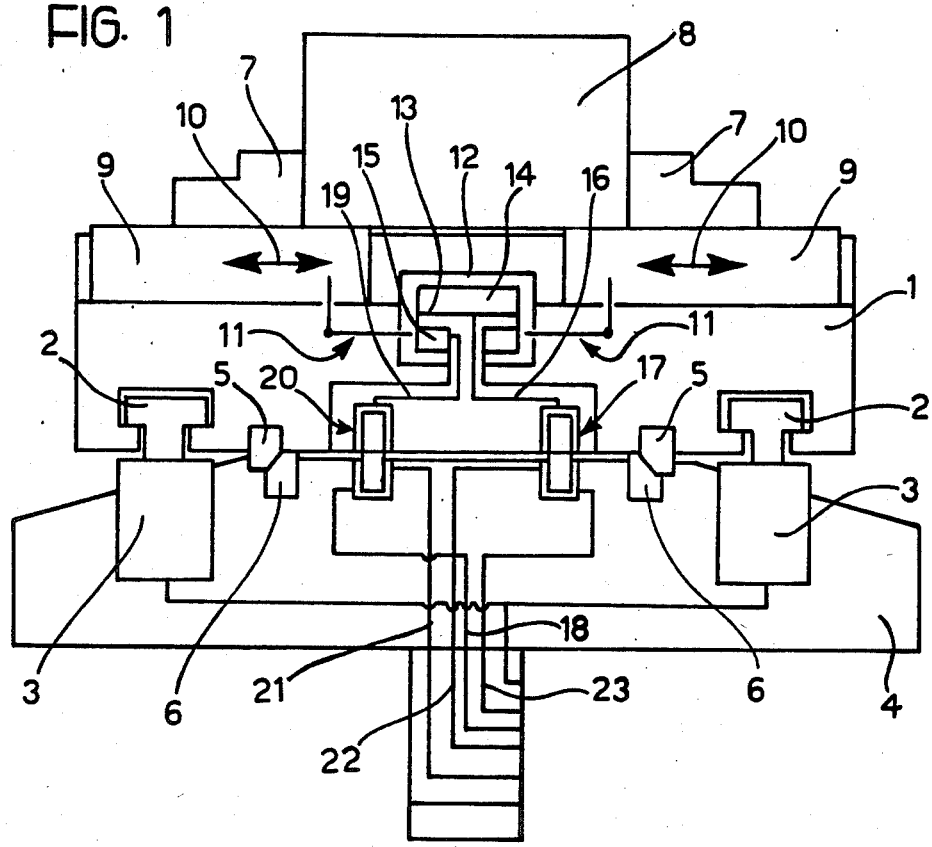
FIG. 1 is a schematic sectional view showing the base fitting (rotary pallet support) and self-centering platform (pallet) supported thereon, incorporating the system according to the invention.

FIG. 1 of the drawings shows a self-centering pallet 1 which is fixed to a rotary pallet support 4 in known manner by guide means 2 operated by hydraulic cylinders 3, and is centered relative thereto by means of adjustable bearing blocks 5 and 6 respectively.

The jaws for clamping a workpiece 8 are indicated 7. They are mounted on radial slides 9 mounted in guides formed in the upper surface of the pallet 1 for simultaneous sliding in the direction of the arrows 10 under the action of known drive mechanisms (which are thus illustrated only schematically at 11) controlled by the hydraulic cylinder 12. The latter is slidable in the direction of the axis of the pallet relative to a stationary piston 13. The latter divides the interior of the cylinder 12 into two chambers, 14 and 15 respectively. The chamber 14 communicates through a duct 16 and a connecting device 17, which will be described in detail below, with a supply and discharge duct 18 formed in the support 4 and connected to the exterior by means of a distributor (not illustrated).

In its turn, the chamber 15 communicates through a duct 19 and a connecting device 20, identical to the device 17, with a supply and discharge duct 21 also formed in the support 4.

Ducts 22 and 23 are arranged to supply a pilot pressure to the devices 17 and 20 in a manner and for the purposes which will also be described below.

The connecting device 17 (and, of course, the one 20 identical thereto) includes (see FIGS. 2 to 4) a flanged bushing 24 projecting slightly from the lower surface of the self-centering pallet 1 facing the pallet support 4. It is mounted with a certain radial clearance and seals the bottom of a cylindrical chamber 25 the top of which communicates with the duct 16 (see FIG. 1) connected to the chamber 14 of the cylinder 12. The axial through-hole of the bushing is tapered so as to widen downwardly, and an annular groove formed in its periphery houses a washer 26 shaped in the form of an O-ring. The chamber 25 houses a cylindrical body 27 carrying an annular sealing washer 28 around its periphery. The body 27 has an axial through-hole 29 defining an internal annular seat 30 above which is located a ball 31 urged constantly towards the seat by a spring 32.

Figure 2:
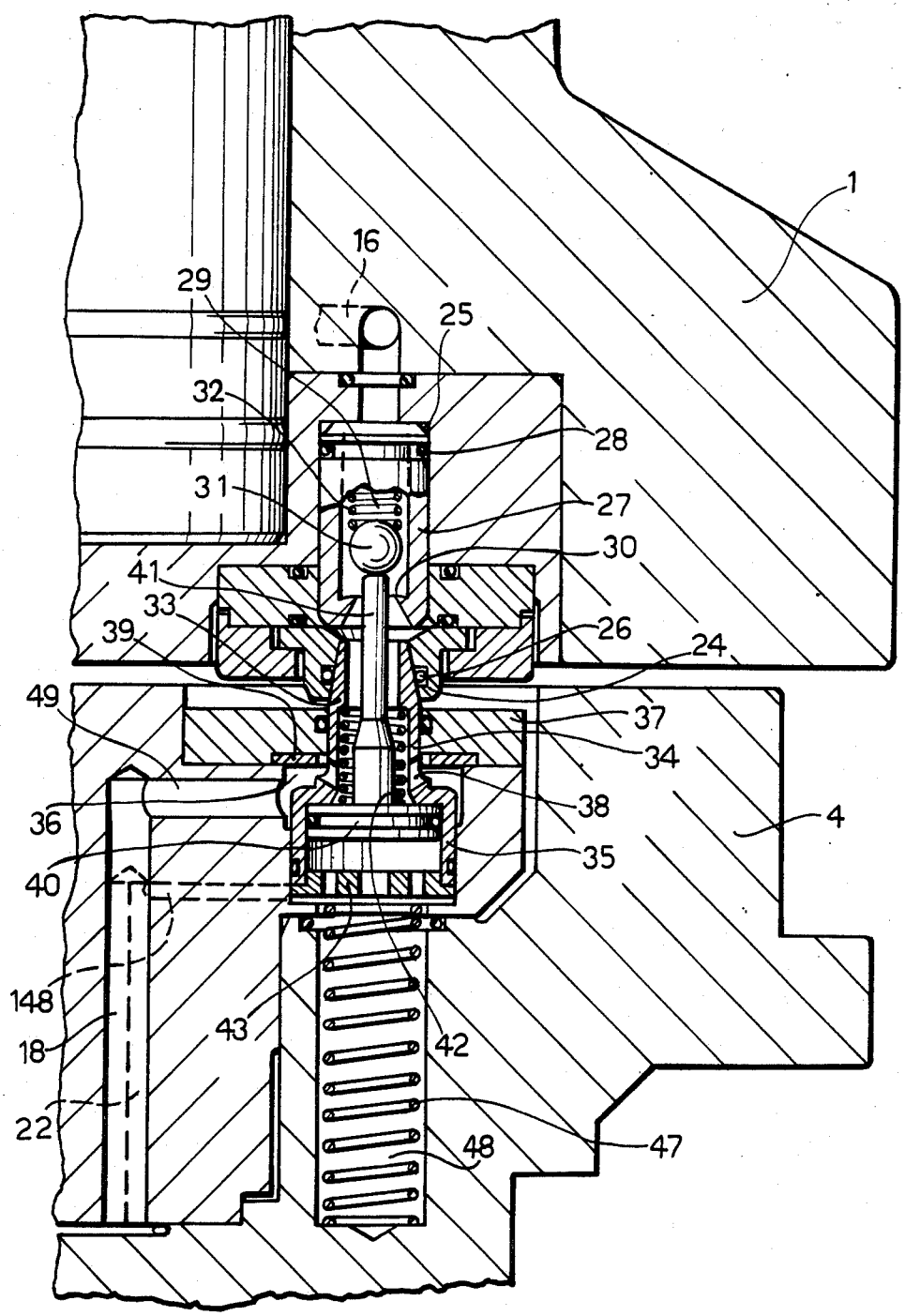
FIGS. 2, 3 and 4 are sections on an enlarged scale, showing several details of the structure of FIG. 1 in three different operating positions.
Figure 3:
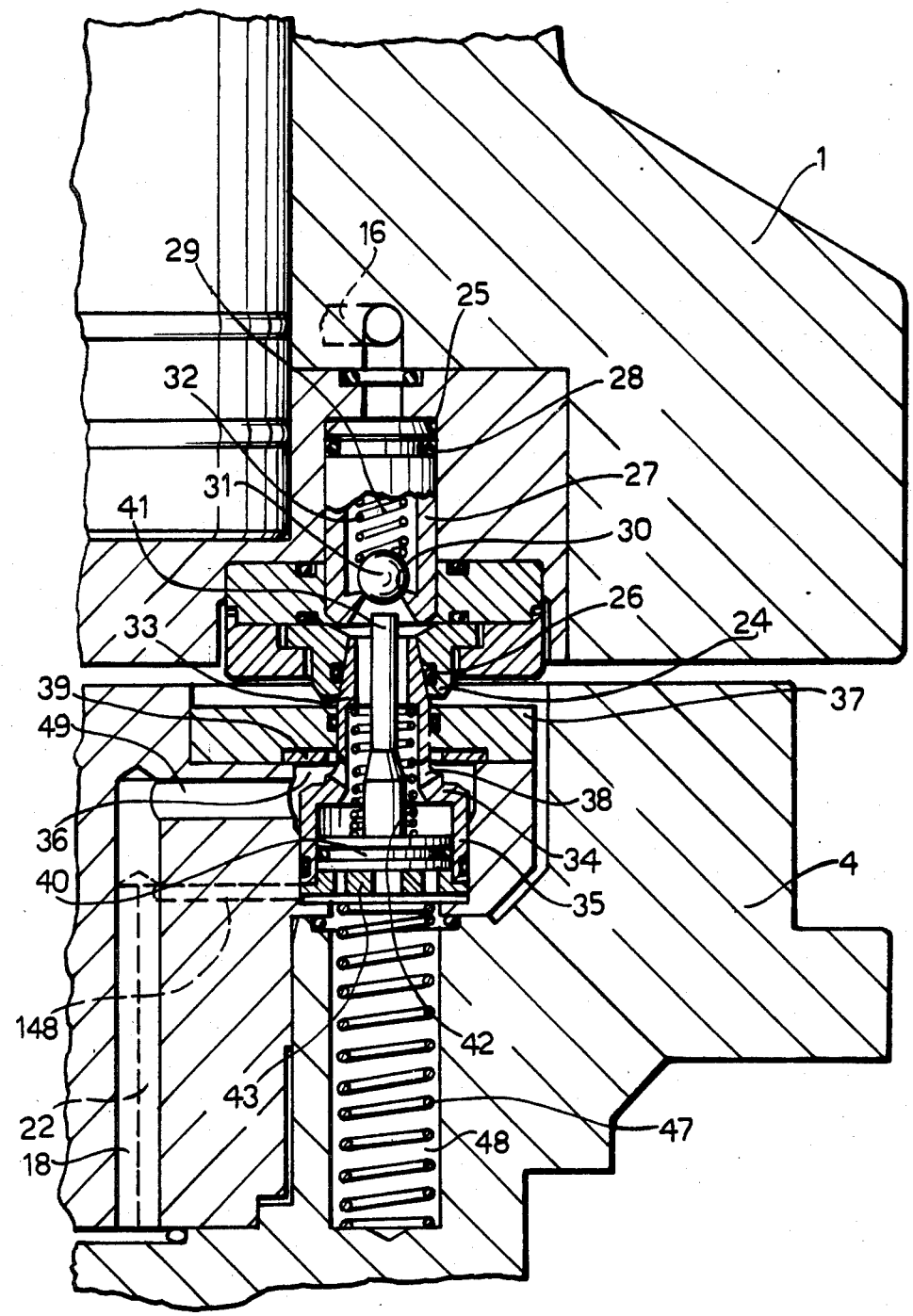
Figure 4:
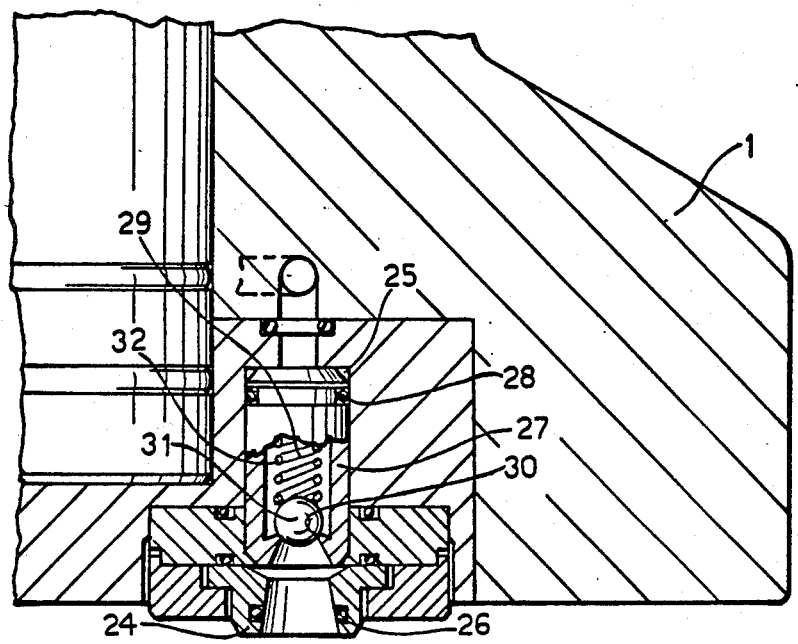
Figure 4:
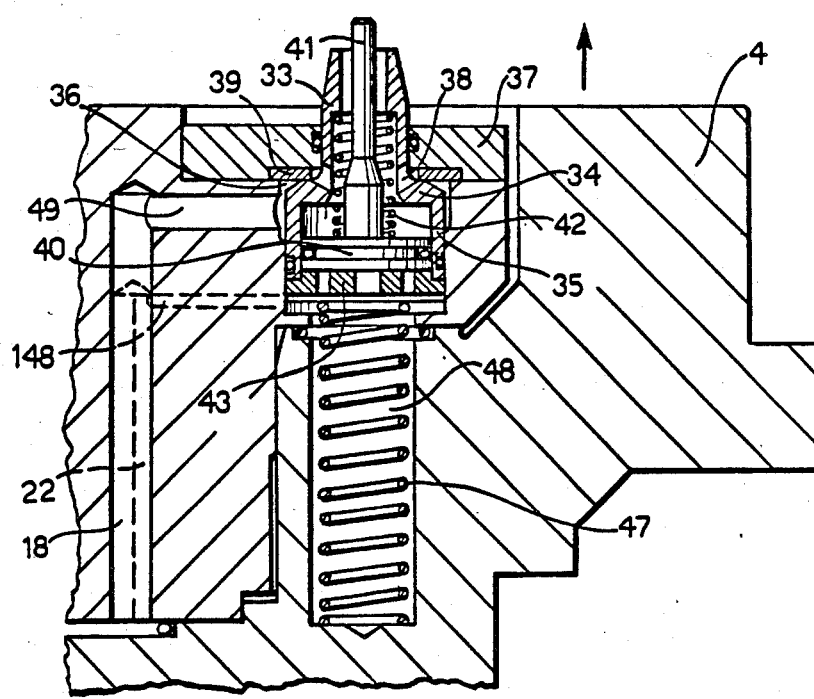

The tapered end of a tubular member 33, which acts as a connector and projects from the upper face of the pallet support 4, is inserted in the axial hole of the bushing 24 when the parts occupy the positions illustrated in FIGS. 1 to 3.

The lower end of the member 33 is joined by means of an annular transverse wall 34 to the top of a cylindrical tubular body 35 sealingly slidable in a cylindrical chamber 36 the upper wall 37 of which is removable and is formed with a hole through which the tubular member 33 passes sealingly.

Through-holes 38 are formed in the latter close to the transverse wall 34, and an annular washer 39 is applied to the lower face of the upper wall 37 with its inner perimeter located slightly outwardly of the mouths of the through-holes 38.

Within the tubular body 35 is sealingly slidable a piston 40 with a rod 41 which projects from its upper surface and extends through the tubular member 33 and beyond, even when the parts occupy the positions illustrated in FIGS. 1 to 3. A spring 42 interposed between the piston and an inner shoulder of the tubular member 33 urges the piston downwardly.

Figure 5:
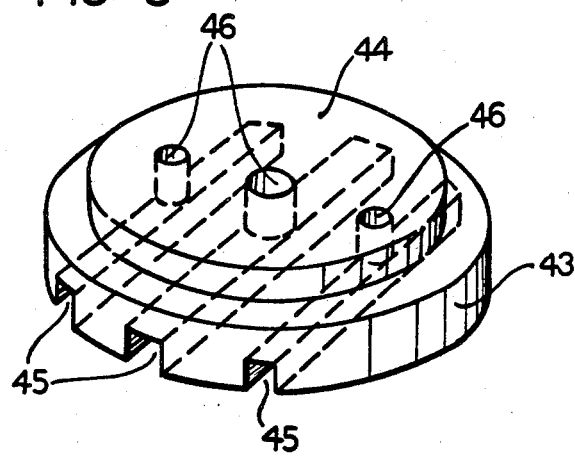
FIG. 5 is a perspective view of a constructional detail of the structure illustrated in FIGS. 2 to 4.

The lower end of the tubular body 35 bears against the peripheral part of a disc 43 (see also FIG. 5) at the bottom of the chamber 36. It has a central circular projection 44 against which the piston 40 bears (when the parts are in the positions illustrated in FIGS. 1, 2 and 4). The lower face of the disc is formed with through-grooves 45 communicating with axial holes 46 which open in correspondence with the upper face of the central circular projection 44. The chamber 36 has a lower, coaxial extension 48 which houses a helical spring 47 interposed between the bottom of the extension and the lower face of the disc 43. A lateral passage 148 connects the lower part of the chamber 36 housing the disc 43 to the supply duct 22 for the pilot pressure, while a transverse passage 49 joins the top of this chamber to the duct 18 (see also FIG. 1) forming part of the line for the inlet of pressurised liquid to and its discharge from the chamber 14 of the cylinder 12.

The operation of the structure described above is as follows:

Since the self-centering pallet 1 is placed on the pallet support 4 and is fixed and centered relative thereto by the guides 2 and the bearing blocks 5 and 6, as illustrated in FIGS. 1, 2 and 3, the thrust exerted by the bushings 24 on the tubular members 33 of the connecting devices 17 and 20 moves these bushings downwardly until the lower ends of the respective tubular bodies 35 contact the peripheral parts of the discs 43 which are thus sealed against the bottom of the corresponding chambers 36.

Under these conditions, the interior of each of the tubular members 33 of the respective connecting devices 17 and 20 communicates with the corresponding duct 18 and 21. Simultaneously, the pressurised piloting liquid is supplied beneath the discs 43 through the ducts 22 and 23 respectively. This has the effect of advancing the pistons 40 against the action of the springs 42 and moving the rods 41 carried by the pistons upwardly, with a consequent raising of the balls 31 from their underlying seats 30 (see FIG. 2).

Under these conditions, if pressurised liquid is supplied to one of the ducts 18 or 21, pressure increases in one of the chambers 14 or 15 of the cylinder 12 and liquid flows from the other of these chambers. Consequently, the slides 9 and the jaws 7 are moved to clamp or release the workpiece 8 inserted therebetween, according to the nature of the mechanism 11 between the cylinder 12 and the slides 9.

Whenever it is a matter of clamping the workpiece 8 and it is desired to transfer the self-centering pallet 1 to another station, for example to the working station of a vertical turning machine, the piloting pressure in the ducts 22 and 23 must first of all be lowered to atmospheric pressure. This would in fact occur as a result of the movement of the pistons 40 and their rods 41 to the position indicated in FIG. 3. It is to be noted that the non-return valve will be closed in this position.

A simultaneous lowering of the pressure in the ducts 21 and 18 as well will now enable the actuation of the cyliinders 3 to raise the guides 2 and, with them, the self-centering pallet 1 (see FIG. 4) so as to disengage it from the underlying pallet support 4.

The raising of the bushings 24 which occurs during this movement of the self-centering pallet 1 will cause an upward movement of the disc 43 under the action of the spring 47 and the consequent upward movement of the tubular body 35. The dimensions of the parts are such that, before this movement stops, the annular outer surface of the transverse wall 34 abuts to the washer 39 to prevent communication between the passage 49 and the interior of the tubular element 33 before the bushing 24 has become detached from the tubular element 33.

By virtue of the structure described above, the closure of the valves 31 and 30 will prevent any flow of oil out of the opposing chambers of the cylinder 12 through the ducts 16 and 19 (see FIG. 1), ensuring that the workpiece 8 remains clamped between the jaws 7, and will also prevent any flow of pressurised oil through the tubular members 33.

Naturally, the invention extends to other embodiments which achieve equal utility and/or effectiveness by using the same innovative concept.

What is claimed is:

1. In a machine tool of the type having a loading and unloading station, a working station, respective pallet supports at said stations, and a self-centering pallet provided with jaws and movable between said pallet supports, a system for controlling the jaws of said pallet including a double-acting hydraulic cylinder incorporated in the pallet to control the movements of said jaws, a pair of supply and discharge ducts connected to said cylinder, and a hydraulic control circuit outside the pallet having a pair of ducts communicating with said supply and discharge ducts, wherein the improvements consist in said ducts of the external hydraulic control circuit being formed in the pallet support of one of said stations, and each of said ducts communicating with one of the supply and discharge ducts through a respective connecting device including:

interengageable connectors mounted in correspondence with the mutually-facing surfaces of said pallet and said pallet support, the connector projecting from the pallet support being movable axially;

a pallet support valve which is connected to the connector on said pallet support and is held open against a resilient force when said connector on said pallet support is engaged in the connector projecting from said pallet during the superpositioning of said pallet on said pallet support;

a non-return valve recessed in the connector projecting from said pallet;

a rod passing through the connector projecting from said pallet support and able to advance and open the non-return valve independently of the pallet support valve; and a piston connected to said rod to effect the advance of the rod upon the application of a pilot pressure to the piston.

2. A system as defined in claim 1, wherein each connector carried by said pallet is constituted by an externally-flanged bushing with an upwardly-tapered axial through-hole defining an annular groove, an annular sealing washer being housed in said groove, and wherein each connector carried by said pallet support is constituted by a tubular member having an upper tapered portion adapted to fit sealingly into the axial through-hole of said bushing.

3. A system as defined in claim 2, wherein said pallet defines a chamber in correspondence with its surface facing the upper surface of said pallet support, said bushing being located so that its through-hole communicates with the lower part of said chamber and the upper part of said chamber being connected to one of the chambers of said control cylinder for the jaws, and wherein a cylindrical body with an axial through-hole is sealingly inserted in said chamber in a zone intermediate the lower and upper ends of said chamber, said through-hole being controlled by said non-return valve.

4. A system as defined in claim 3, wherein each of said connecting devices on the pallet support further includes a cylindrical tubular body coaxial with said tubular member, an annular transverse wall connecting said member to the top of said body, and a cylindrical chamber defined by said pallet support and in which said cylindrical tubular body is sealingly slidable, said chamber having an upper wall which defines a hole through which said tubular member passes sealingly and which is connected to one of said ducts of said hydraulic control circuit, and wherein the tubular member defines at least one through-hole close to said transverse wall, an annular washer is applied to the lower face of the upper wall of said cylindrical chamber and has an inner diameter such that its inner periphery is located outwardly of the mouth of said at least one through-hole, and resilient means are provided to urge said cylindrical tubular body towards said washer.

5. A system as defined in claim 4, wherein said piston is sealingly slidable in said cylindrical tubular body and said rod which passes through the connector on said pallet support is fixed to the upper surface of said piston, a spring being interposed between said piston and the transverse wall of said tubular element to oppose the upward movement of said rod out of said tubular element, and wherein the length of the rod is such that its upper end is spaced from the non-return valve housed in said pallet when said pallet is placed on said pallet support and when, consequently, said tubular body and said piston are in their lower end-of-stroke positions.

6. A system as defined in claim 5, wherein the lower end of said cylindrical tubular body and the lower surface of said piston are spaced from the bottom or said cylindrical chamber by a separator disc, said disc having an upper circular central projection of reduced diameter for supporting said piston and defining through-grooves in its lower face and through-holes which connect the grooves to the surface of the central projection, and wherein the lower end of said cylindrical chamber communicates with a duct for supplying pressurised pilot liquid and has a lower coaxial extension of smaller diameter, said extension housing a pre-compressed spring interposed between the bottom of the extension and the separator disc to act as resilient means for urging said cylindrical tubular body towards said annular washer on the lower face of said upper wall of said cylindrical chamber.

* * * * *